United States Patent [19]

Muchel

[11] Patent Number: 4,691,997
[45] Date of Patent: Sep. 8, 1987

[54] MICROSCOPE TUBE

[75] Inventor: Franz Muchel, Königsbronn, Fed. Rep. of Germany

[73] Assignee: Carl-Zeiss-Stiftung, Heidenheim on the Brenz, Fed. Rep. of Germany

[21] Appl. No.: 831,880

[22] Filed: Feb. 24, 1986

[30] Foreign Application Priority Data

Mar. 8, 1985 [DE] Fed. Rep. of Germany ....... 3508306

[51] Int. Cl.$^4$ .................. G02B 17/08; G02B 21/00
[52] U.S. Cl. .................................. 350/503; 350/522; 350/572
[58] Field of Search ................ 350/503–505, 350/507, 511, 514, 522, 569, 571–573

[56] References Cited

U.S. PATENT DOCUMENTS

| 2,307,951 | 1/1943 | Plaut et al. | 350/507 |
| 4,221,459 | 9/1980 | Fisher | 350/503 |
| 4,299,439 | 11/1981 | Stromblad | 350/522 |

FOREIGN PATENT DOCUMENTS

| 1020810 | 12/1957 | Fed. Rep. of Germany | 350/507 |
| 713171 | 8/1954 | United Kingdom | 350/503 |
| 911827 | 11/1962 | United Kingdom | 350/503 |

Primary Examiner—William H. Punter
Attorney, Agent, or Firm—Stonebraker, Shepard & Stephens

[57] ABSTRACT

A compact microscope tube which provides an image which is right-way up and right-way round, and which permits the placing of attachments such as cameras in locations which do not impede the normal movements of the person using the microscope for observation. A first concave reflecting mirror (7) is arranged behind a tube lens (11) and serves to fold an initially vertical light path downwardly at an acute angle, while a second flat mirror (8) further folds it toward the eyepiece attachment location (21) An optical system (12) between the first and second mirrors again forms an intermediate image of the object (20) in the eyepiece cups (28a and 28b).

9 Claims, 1 Drawing Figure

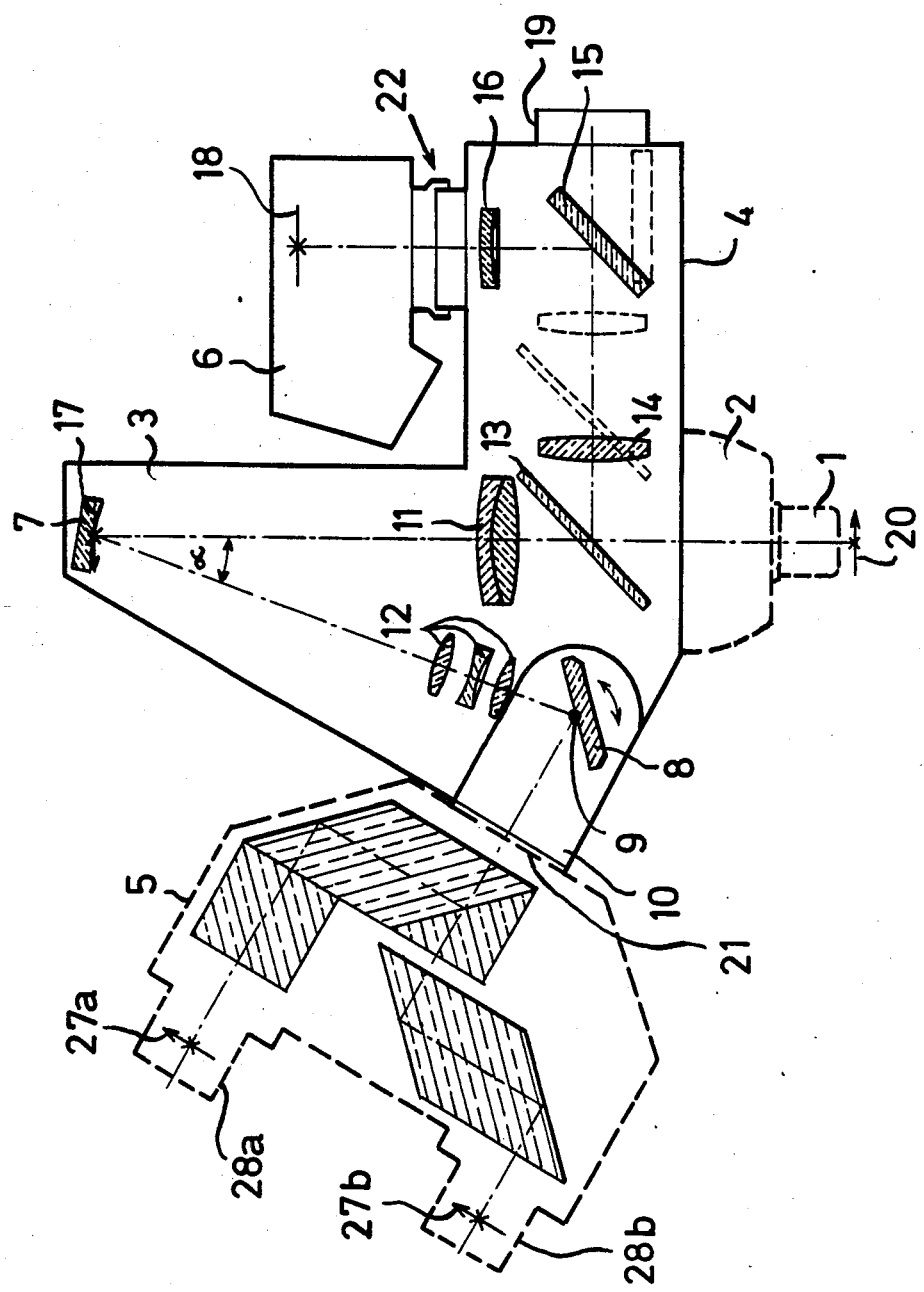

4,691,997

MICROSCOPE TUBE

This invention relates to a microscope tube having an optical system which images a first intermediate image of the object formed by the microscope objective, to form a second image which is erect rather than inverted, right way up and right way round with respect to the observer in the plane of the eyepiece image. Such microscopes are required, in particular, in the semiconductor industry for the inspection of wafers, masks, and the like.

The microscope tubes known up to the present time which have an image-reversing optical system are of relatively large structural length and contain a large number of optical parts. For example, a microscope tube is known from German Federal Republic Gebrauchsmuster No. 79 31 427 of 7 Feb. 1980 and the corresponding U.S. Pat. No. 4,299,439, G. Stromblad, granted Nov. 10, 1981, in which the reversal of the image (to make it erect) is effected by an optical system mounted in an intermediate tube. This intermediate tube is relatively long in a direction toward the observer, and it does not permit the placing-on of attachments for photographic documentation.

Microscopes are also known which have special photometer tubes in which the light path is conducted over a concave reflecting mirror which is arranged in an intermediate-image plane and bears the measurement diaphragm for the photometer arranged behind it. For example, such photometer microscopes are described in U.S. Pat. No. 3,827,811, Y. Kato, granted Aug. 6, 1974, and in German Federal Republic Offenlegungsschrift (unexamined but published application) No. 32 13 145, K. Weber, published 20 Oct. 1983. These known microscopes, however, do not provide a viewing image which is erect both vertically and laterally. Also, in these known microscopes it is difficult to apply attachments (such as cameras) at a place where the attachments would not interfere or impede the freedom of movement of the viewer, i.e., apply them at the rear of the tube, remote from the person using the microscope.

From Federal Republic of Germany Offenlegungsschrift No. 20 15 839, G. Vogl, published 19 Nov. 1970, and the corresponding British Pat. No. 1,304,941, Jungner Instrument AB, published 31 Jan. 1973, it is known to have a stereomicroscope having a tube within which the optical path is folded in order to decrease the size of the tube in a vertical direction. However, the disclosed structure is relatively expensive, due to the relatively large number of reflective surfaces. Furthermore, this structure operates without intermediate imaging in the tube, and therefore can not be transferred directly to the conditions present in a simple microscope.

SUMMARY OF THE INVENTION

An object of the invention is the provision of a generally improved and more satisfactory microscope tube, providing an erect image to the viewer and free of the various disadvantages and undesirable features above mentioned in connection with the cited prior art.

In particular, it is an object of the invention to provide a microscope tube which supplies an erect or right-way-up image and which permits the convenient use of attachments such as cameras for photographic documentation, and which, at the same time, is of a relatively small size compact construction, having a minimum of optical parts.

This object is achieved, according to a preferred embodiment of the invention, by providing a tube with an observation light path which extends linearly and substantially vertically between the microscope objective and a first intermediate image, with a concave reflecting mirror in the vicinity of the first intermediate image to reflect the light path at an acute angle downward toward a flat reflecting mirror in the vicinity of an exit to which a binocular viewing tube is attached. Also, an intermediate-imaging optical system is arranged between the concave reflecting mirror and the flat reflecting mirror.

The tube contains merely two reflecting surfaces by means of which the light path is folded. The intermediate-imaging optical system can be developed relatively inexpensively, since the concave shape of the first reflecting mirror has a positive effect on the correction of the Petzval curvature. Furthermore, by means of the positive focal length of the mirror, the pupil can be adapted to the intermediate-imaging optical system. Also, it is readily possible to arrange beam splitting means in the part of the folded light path which is more remote from the observer, in order to divert part of the light path to a photographic camera or other desired attachment which may be detachably or interchangeably placed on the rear side of the tube. This arrangement does not interfere with the desired compactness of the construction, and when the camera or other attachment is present, it does not obstruct the working space of the user nor obstruct his normal freedom of movement.

It is advisable for the flat reflecting mirror, constituting the second reflecting element, to be rotatable about a horizontal axis. This affords the user the comfort of a variable viewing angle and of adjustability of the height of the eyepiece.

Other advantages of the invention will become apparent from the detailed description of the preferred embodiment.

BRIEF DESCRIPTION OF THE DRAWING

The single figure is a schematic view, mainly in vertical section, illustrating a preferred embodiment of the invention.

DESCRIPTION OF THE PREFERRED EMBODIMENT

Referring now to the drawing, there are shown in broken lines a conventional objective 1 and conventional turret 2 of a microscope. The microscope tube 3 of the present invention has a flat bottom 4 which is placed on and supported by the usual conventional microscope stand or frame of a reflected-light microscope, in cooperative working relation to the turret 2 and objective 1.

The tube 3 contains a tube lens 11 which produces a first intermediate image of the object 20 at the image plane 17 at the upper end of the tube. A concave reflecting mirror 7 is located at this intermediate image plane 17. This mirror deflects the light path at an acute angle downward toward a second reflecting mirror 8, which is a flat or plane mirror.

The mirror 8 is located in the vicinity of the light path exit opening or port 21 at the front of the tube. The mirror rotates on a horizontal axis 9. The tube 3 also contains a swingable part 10 on the outer end of which the conventional binocular tube or eyepiece 5 is mounted. This part 10 swings about the same horizontal axis 9 on which the mirror 8 turns. As the part 10 (with the binocular tube or eyepiece 5 mounted on it) is swung up or down on the axis 9, to vary the height of the binocular eyepiece and the angle of observation for the convenience of the user, the mirror 8 swings with it, through half of the angle of swing of the part 10. This is accomplished through any convenient known form of operating connection (not shown), such as the gearing illustrated in FIGS. 2 and 3 of the above-mentioned U.S. Pat. No. 4,299,439, where the mirror 10 of that patent swings through half of the angle of swing of the part 7. Because of this swinging of the mirror 8 of the present construction, the observation light path, coming down from the upper mirror 7 to the mirror 8, is always deflected properly along the optical axis of the swingable part 10 and along the input optical axis of the attached binocular eyepiece 5.

The binocular tube or eyepiece 5 may be of conventional construction, having the usual conventional viewing cups 27a and 27b for the two eyes of the user. In actual use, these two cups would be side by side, and one of them would be hidden from view when viewed in the same direction as the main part of the drawing. For clearer schematic illustration, the drawing shows the eyepiece turned 90 degrees from its position of use.

Between the concave mirror 7 and the flat mirror 8, there is an imaging optical system 12, developed as a triplet. By means of this optical system 12, another intermediate imaging of the object 20 is produced in the imaging planes 27a and 27b in the viewing cups 28a and 28b of the binocular tube 5. The image produced there is erect, rightway up and rightway round.

Below the tube lens 11 in the main microscope tube 3, there is a mirror 13 for deflecting light coming from the objective 1 toward an auxiliary lens 14, from which the deflected beam may continue to any desired auxiliary equipment or unit, such as a photographic camera. The mirror 13 may be either a totally reflecting mirror, or a partially reflecting and partially transmitting mirror. If the latter, it may stay in the position illustrated in full lines, allowing observation to take place simultaneously with use of the camera or other auxiliary equipment. If the mirror is totally reflecting, it and the accompanying lens 14 are mounted together on a carriage or slide movable along a track or guideway, to be moved from the full line position to the dotted line position illustrated, when the apparatus is to be used for microscopic viewing, and moved back to the full line position when the camera is to be used. Of course the movable mounting of mirror and lens may also be used, if desired, when the mirror is partially reflecting.

Behind the auxiliary lens 14 (to the right of it, in the drawing) is another swingable mirror 15. When this mirror is in the full line position shown, at approximately 45 degrees to the incoming light beam, it deflects the light beam upwardly to another auxiliary lens 16 which images the object 20 in the focal plane 18 of a camera 6 mounted at the image exit port 22. When the mirror 15 is swung down to the dotted line position illustrated, the light beam from the mirror 13 and lens 14 continues horizontally rightwardly to another exit port 19 and into whatever auxiliary or supplementary apparatus or unit is mounted at that port.

What is claimed is:

1. A microscope tube comprising an optical system producing a first intermediate image of an object and a further image of said first intermediate image in a viewing plane of a viewing eyepiece, the image in said viewing plane of said eyepiece being an erect image of said object, right-way up and right-way round, said tube and its optical system including:
    (a) means providing a linear and substantially vertical observation light path from a microscope objective to said first intermediate image;
    (b) a concave reflecting mirror in the vicinity of said first intermediate image;
    (c) means forming a light path exit port and eyepiece attachment place at a location below said first intermediate image;
    (d) a flat mirror located in the vicinity of said exit port;
    (e) said concave mirror serving to reflect said light path at an acute angle downwardly toward said flat mirror;
    (f) said flat mirror serving to reflect said light path forwardly toward said exit port and toward an eyepiece mounted at said port; and
    (g) an intermediate imaging optical system operatively located in said light path between said concave mirror and said flat mirror.

2. The invention defined in claim 1, wherein said flat mirror is rotatable about a horizontal axis.

3. The invention defined in claim 1, further comprising reflecting means in said observation light path between said microscope objective and said concave mirror, said reflecting means being effective to divert at least a part of the light from said light path to a supplementary appliance mounted on said tube.

4. The invention defined in claim 3, wherein said reflecting means is movable into and out of said observation light path.

5. The invention defined in claim 3, further comprising a tube-lens optical system (11) located in said observation light path between said reflecting means (13) and said concave mirror (7) for producing said first intermediate image (17).

6. A microscope tube wherein means including a microscope objective produces a first intermediate image of an object and an optical system again images said first intermediate image at an observation plane of an eyepiece in an erect right-way up and right-way round orientation with respect to an observer viewing the image at said eyepiece, characterized by the fact that:
    (a) the observation light path between said objective (1) and said first intermediate image (17) is linear and substantially vertical;
    (b) a concave mirror (7) is located in the vicinity of said first intermediate image (17) and reflects the light path at an acute angle downwardly toward a flat mirror (8);
    (c) a flat reflecting mirror (8) is located in the vicinity of an exit (21) at which a binocular viewing eyepiece (5) is attached, said flat mirror reflecting the light path toward said binocular eyepiece; and
    (d) an intermediate-imaging optical system (12) is arranged between said concave mirror (7) and said flat mirror (8).

7. A microscope tube according to claim 6, characterized by the fact that said flat mirror (8) is turnable about a horizontal axis (9).

8. A microscope tube according to claim 6, characterized by the fact that reflecting means (13) which can be switched into and out of the optical path is arranged between said objective (1) and said concave reflecting mirror (7).

9. A microscope tube according to claim 8, characterized by the fact that a tube-lens system for producing a first intermediate image (17) is arranged between the switchable reflecting means (13) and the concave reflecting mirror (7).

* * * * *